United States Patent
Rhee et al.

(10) Patent No.: US 11,404,700 B2
(45) Date of Patent: Aug. 2, 2022

(54) POSITIVE ELECTRODE FOR LITHIUM AIR BATTERIES WITH EXCELLENT STABILITY, METHOD OF MANUFACTURING THE SAME, AND LITHIUM AIR BATTERY INCLUDING THE SAME

(71) Applicants: Hyundai Motor Company, Seoul (KR); Kia Motors Corporation, Seoul (KR)

(72) Inventors: Jun Ki Rhee, Gyeonggi-do (KR); Sam Ick Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 16/682,805

(22) Filed: Nov. 13, 2019

(65) Prior Publication Data
US 2020/0303747 A1    Sep. 24, 2020

(30) Foreign Application Priority Data
Mar. 18, 2019  (KR) .................. KR10-2019-0030388

(51) Int. Cl.
| | | |
|---|---|---|
| H01M 4/36 | (2006.01) | |
| H01M 4/86 | (2006.01) | |
| H01M 12/08 | (2006.01) | |
| H01M 4/38 | (2006.01) | |
| H01M 4/40 | (2006.01) | |
| H01M 4/88 | (2006.01) | |
| H01M 50/411 | (2021.01) | |
| H01M 4/02 | (2006.01) | |

(52) U.S. Cl.
CPC .......... *H01M 4/8647* (2013.01); *H01M 4/382* (2013.01); *H01M 4/405* (2013.01); *H01M 4/8673* (2013.01); *H01M 4/8828* (2013.01); *H01M 12/08* (2013.01); *H01M 50/411* (2021.01); *H01M 2004/027* (2013.01); *H01M 2004/8689* (2013.01); *H01M 2300/0045* (2013.01)

(58) Field of Classification Search
CPC .... H01M 4/8647; H01M 4/405; H01M 4/382; H01M 4/8673; H01M 4/8828; H01M 50/411; H01M 12/08; H01M 2004/027; H01M 2004/8689; H01M 2300/0045
See application file for complete search history.

(56) References Cited

U.S. PATENT DOCUMENTS 10,944,120 B2 *  3/2021  Lee .................. H01M 10/0585

FOREIGN PATENT DOCUMENTS

KR    20160031828 A    3/2016

* cited by examiner

*Primary Examiner* — Raymond Alejandro
(74) *Attorney, Agent, or Firm* — Fox Rothschild LLP

(57) ABSTRACT

Disclosed are a positive electrode for lithium air batteries with excellent stability, a method of manufacturing the same, and a lithium air battery including the same, and a lithium air battery with improved stability by including the positive electrode. The positive electrode may include a conductive material and an ionic liquid such that the process of manufacturing the lithium air battery may be simplified, and the stability of the lithium air battery may be further improved as the result of inhibition of side reactions.

8 Claims, 3 Drawing Sheets

POSITIVE ELECTRODE FOR LITHIUM AIR BATTERIES WITH EXCELLENT STABILITY, METHOD OF MANUFACTURING THE SAME, AND LITHIUM AIR BATTERY INCLUDING THE SAME

CROSS-REFERENCE TO RELATED APPLICATION

This application claims, under 35 U.S.C. § 119(a), the benefit of priority to Korean Patent Application No. 10-2019-0030388 filed on Mar. 18, 2019, the entire contents of which are incorporated herein by reference.

TECHNICAL FIELD

The present invention relates to a positive electrode for lithium air batteries with excellent stability, a method of manufacturing the same, and a lithium air battery including the same.

BACKGROUND

A lithium air battery, including a negative electrode, a positive electrode using oxygen in air as a positive electrode active material and including an oxygen redox catalyst, and a lithium ion conductive electrolyte provided between the positive electrode and the negative electrode, is well known.

The lithium air battery may be classified as an aprotic lithium air battery, an aqueous lithium air battery, a solid-state lithium air battery, or a mixed aqueous/aprotic lithium air battery, depending on the kind of the electrolyte. In the case of an aprotic lithium air battery, an aprotic electrolyte that only weakly reacts with a negative electrode made of a lithium metal is used, whereby the structure of the battery is simple, and the energy density of the battery is high. However, solid-state $Li_2O_2$, which is a byproduct generated at the time of discharging the battery, blocks pores in an air electrode as the discharging of the battery is continuously performed. As a result, the area in which oxygen, electrons, and lithium ions react with each other is reduced and the discharge capacity of the battery is reduced.

In addition, the aprotic electrolyte is decomposed due to the instability of the aprotic electrolyte at the time of charging and discharging the battery, whereby a byproduct such as $Li_2O_3$ or $Li_2O$ is irreversibly generated instead of $Li_2O_2$. In recent years, various kinds of organic electrolytes have been applied, and the stabilities thereof have been evaluated in order to solve this problem. Nevertheless, the reduction in the stability has still not been overcome, as previously described.

The above information disclosed in this Background section is provided only for enhancement of understanding of the background of the invention and therefore it may contain information that does not form the prior art that is already known in this country to a person of ordinary skill in the art.

SUMMARY

In preferred aspects, provided are a positive electrode for lithium air batteries and a method of manufacturing the same, such that the side reaction generation rate is reduced, whereby the capacity and lifespan characteristics of the positive electrode are improved.

Further provided is a method of manufacturing a lithium air battery which includes simplified process of manufacturing a positive electrode, thereby improving economic efficiency.

The objects of the present invention are not limited to those described above. The objects of the present invention will be clearly understood from the following description and could be implemented by means defined in the claims and a combination thereof.

In one aspect, provided is a positive electrode for lithium air batteries with excellent stability. The positive electrode may include a conductive material and an ionic liquid. Preferably, the ionic liquid may include cations and anions. The cations may suitably include one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$) and mixtures thereof. The anions may suitably include one selected from the group consisting of chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl)imide (FSI) and mixtures thereof.

The conductive material may suitably include one selected from the group consisting of graphite, carbon black, Ketjen black, acetylene black, carbon nanotubes, a reduced graphene oxide and mixtures thereof.

In another aspect, provided is a lithium air battery with excellent stability. The lithium air battery including the positive electrode as described herein and a negative electrode including a lithium metal, a lithium alloy, or a combination thereof.

For example, the positive electrode of the lithium air battery may include a conductive material and an ionic liquid. Preferably, the ionic liquid may include cations and anions. The cations may suitably include one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$) and mixtures thereof. The anions may suitably include one selected from the group consisting of chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl)imide (FSI) and mixtures thereof. The conductive material may suitably include one selected from the group consisting of graphite, carbon black, Ketjen black, acetylene black, carbon nanotubes, a reduced graphene oxide and mixtures thereof.

The lithium air battery may further include a membrane provided between the positive electrode and the negative electrode, and the membrane may include a separator, a polymer electrolytic membrane, and a combination thereof.

The separator may include a polyolefin polymer.

The separator may suitably include one selected from the group consisting of polyethylene polymer, polypropylene polymer and mixtures thereof.

The lithium air battery may further include an electrolyte provided between the positive electrode and the negative electrode.

The electrolyte may suitably include a solid electrolyte, a liquid electrolyte, of a combination thereof.

The electrolyte may suitably include an ionic liquid, lithium salt, or a combination thereof.

Further provided is a method of manufacturing a positive electrode for lithium air batteries with excellent stability. The method may include: preparing a slurry admixture including a conductive material and an ionic liquid, and forming an electrode layer by applying (e.g., coating) the slurry admixture to a substrate.

The method may further include drying the electrode layer after the slurry admixture is applied.

The conductive material may suitably include one selected from the group consisting of graphite, carbon black, Ketjen black, acetylene black, carbon nanotubes, a reduced graphene oxide and mixtures thereof.

The ionic liquid may suitably include cations and anions, the cations may suitably include one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$) and mixtures thereof. The anions may suitably include one selected from the group consisting of chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl) imide (FSI) and mixtures thereof.

Preferably, the slurry admixture may include an amount of about 1 to 10 wt % of the conductive material and an amount of about 90 to 99 wt % of the ionic liquid, based on the total weight of the slurry admixture.

Alternatively, the mixed slurry may suitably include a amount of about 2 to 5 wt % of the conductive material and an amount of about 95 to 98 wt % of the ionic liquid based on the total weight of the slurry admixture.

The slurry admisture may be prepared by mixing the conductive material and the ionic liquid for about 10 to 60 minutes.

Preferably, the drying may be performed at a temperature of about 100 to 120° C.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
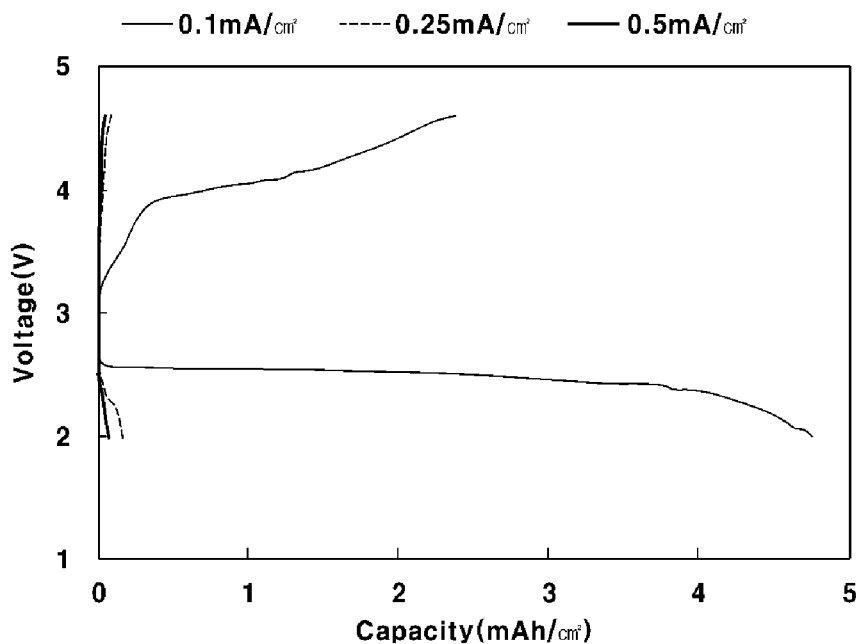
FIG. 1 shows the charge/discharge effects of a lithium air battery manufactured according to Comparative Example 1.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The present invention relates to a lithium air battery having a positive electrode, including a conductive material and an ionic liquid, applied thereto. Hereinafter, a positive electrode including a conductive material and an ionic liquid and a method of manufacturing the same will be described.

Positive Electrode for Lithium Air Batteries

A positive electrode for lithium air batteries according to exemplary embodiments of the present invention may include a conductive material and an ionic liquid, and the ionic liquid includes cations and anions.

The conductive material may suitably include one selected from the group consisting of graphite, carbon black, Ketjen black, acetylene black, carbon nanotubes, a reduced graphene oxide and mixtures thereof.

The ionic liquid as used herein may include a liquid salt constituted only by ions, and includes organic cations and anions having low structural symmetry.

The cations included in the ionic liquid may suitably include one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$) and mixtures thereof.

The anions included in the ionic liquid may suitably include one selected from the group consisting of chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl)imide (FSI) and mixtures thereof.

Lithium Air Battery

A lithium air battery includes a positive electrode and a negative electrode. The negative electrode may suitably a lithium metal, a lithium alloy, or a combination thereof.

The lithium air battery may further include a membrane provided between the positive electrode and the negative electrode, and the membrane may include a separator, a polymer electrolytic membrane, or a combination thereof.

The lithium air battery may further include an electrolyte provided between the positive electrode and the negative electrode.

The positive electrode may suitably include a conductive material and an ionic liquid as described above.

The conductive material may suitably include one selected from the group consisting of graphite, carbon black, Ketjen black, acetylene black, carbon nanotubes, a reduced graphene oxide and mixtures thereof.

The ionic liquid may suitably include one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$), chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl)imide (FSI) and mixtures thereof.

The lithium metal or the lithium alloy included in the negative electrode is not particularly restricted, as long as the lithium metal or the lithium alloy is capable of generating lithium ions in the negative electrode of the lithium air battery.

The separator separates or isolates the positive electrode and the negative electrode from each other, and enables lithium ions to be transferred between the positive electrode and the negative electrode. The separator is not particularly restricted, as long as the separator is capable of transmitting only lithium ions but blocking others. For example, the separator may suitably include a porous nonconductive or insulative material. For example, non-woven fabric made of polypropylene, non-woven fabric made of polyphenylene sulfide, or porous film made of an olefin resin, such as polyethylene or polypropylene, may be used as the separator.

The separator may be an independent member, such as film, or a coating layer added to the positive electrode and/or the negative electrode.

The separator may be impregnated with an electrolyte, and may be used as a support for supporting the electrolyte.

The polymer electrolytic membrane may suitably include a polymer electrolytic membrane having lithium ion conductivity. For example, the polymer electrolytic membrane may suitably include one selected from the group consisting of lithium ion conductive glass, a lithium ion conductive crystal (ceramic or glass-ceramic), a lithium ion conductive polymer, lithium salt and mixtures thereof.

The electrolyte may include an ionic liquid.

The ionic liquid may suitably include one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$), chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl)imide (FSI) and mixtures thereof.

The electrolyte may suitably include a solid electrolyte, a liquid electrolyte, or a combination thereof.

The electrolyte may further include lithium salt. The lithium salt is not particularly restricted, as long as the lithium salt is capable of being applied to a lithium air battery.

The lithium salt may be included in the electrolyte at a concentration of about 0.2 to 0.4 M.

The solid electrolyte may suitably include a polyethylene oxide doped with the lithium salt and a polymer.

Since the positive electrode according to the present invention already includes an ionic liquid capable of conducting lithium ions, the positive electrode is not impregnated with the electrolyte.

Method of Manufacturing Positive Electrode for Lithium Air Batteries

A method of manufacturing the positive electrode for lithium air batteries according to the present invention will be described, other than the features redundant with the above description of the positive electrode for lithium air batteries and the lithium air battery.

The method of manufacturing the positive electrode for lithium air batteries according to the present invention may include: a step of preparing (or providing) a conductive material and an ionic liquid, a step of preparing a slurry admixture including the conductive material and the ionic liquid, and a step of forming an electrode layer by applying (e.g., coating) the slurry admixture to a substrate. A step of drying the electrode layer may be further included after the coating step, as needed.

Preparation Step

The method may include a step of preparing a conductive material and an ionic liquid, which may be included in the positive electrode. Alternatively, the step may include providing a conductive material and an ionic liquid.

The conductive material may be prepared in a form of slurry, powder, and a combination thereof. Preferably, the conductive material may be in a form of powder.

In the case in which the conductive material is slurry, a solvent may include water, N-methyl-2-pyrrolidone, and a combination thereof. Preferably, water may be used as the solvent.

In preferred embodiment of the present invention, the positive electrode includes neither solvent nor binder.

Manufacturing Step for Slurry Admixture of the method may include a step of manufacturing or preparing a slurry admixture, for example, mixing the conductive material and the ionic liquid with each other to manufacture a mixed slurry.

The slurry admixture may suitably include an amount of about 1 to 10 wt % of the conductive material and an amount of about 90 to 99 wt % of the ionic liquid based on the total weight of the slurry admixture. Preferably, the mixed slurry may suitably include an amount of about 2 to 5 wt % of the conductive material and an amount of about 95 to 98 wt % of the ionic liquid based on the total weight of the slurry admixture.

The mixing method is not particularly restricted, as long as it is possible to completely mix the conductive material and the ionic liquid with each other. Preferably, the mixing may be performed for about 10 to 60 minutes.

Coating Step

The method may include a coating step, e.g., applying (e.g., coating) the manufactured slurry admixture to a substrate. Preferably, a porous carbon sheet may be used as the substrate.

The applying method is not particularly restricted, as long as it is possible to apply an electrode slurry in a lithium air battery field.

Drying Step

The method may include a drying step for removing moisture from the slurry admixture applied to the substrate at the coating step. In the case in which the moisture in the ionic liquid is appropriately adjusted at the preparation step or at the mixed slurry manufacturing step, however, the drying step may be omitted.

EXAMPLE

Hereinafter, the present invention will be described in more detail with reference to concrete examples. However, the following examples are merely an illustration to assist in understanding the present invention, and the present invention is not limited by the following examples.

Example 1

(1) Manufacture of positive electrode 0.12 g of powder-type carbon nanotubes (K-Nanos 500P from Kumho Petrochemical Co. Ltd.) were prepared as a conductive material, and 3.5 g of 1-ethyl-3-methylimidazolium bis(trifluoromethylsulfonyl)imide (EMIM-TFSI) was prepared as an ionic liquid. The prepared conductive material and ionic liquid were mixed, and the mixture was stirred in a mortar for 30 minutes to obtain a desired mixed slurry. The stirred mixed slurry was applied to a prepared carbon sheet substrate to manufacture a positive electrode for lithium air batteries.

(2) Manufacture of lithium air battery

Lithium foil was used as a negative electrode, a SUS spacer was used as a negative electrode current collector, and 1-ethyl-3-methylimidazolium bis(trifluoromethylsulfonyl)imide (EMIM-TFSI) was prepared as an electrolyte. In order to avoid direct contact between the positive electrode and the negative electrode, polyethylene non-woven fabric was used as a separator, which was provided in the form of a coating layer wrapping the negative electrode. For example, the separator was prepared so as to be larger than the positive electrode and the negative electrode. The positive electrode manufactured as described above was used to manufacture a lithium air battery. The lithium air battery was manufactured in the form of a 2032 coin cell. Specifically, a hole was formed in the upper end of the coin cell in order to supply air into the coin cell. The lithium foil was attached to the SUS spacer, and then the separator was placed thereon. The electrolyte used for the positive electrode was sprayed onto the separator. In this example, 70 µℓ of the electrolyte was sprayed. The positive electrode was stacked on the separator containing the electrolyte. At this time, the positive electrode and the negative electrode were appropriately arranged such that the reaction surfaces thereof were maintained. A wave spring was mounted in the coin cell in order to maintain contact between inner parts. The inner parts were prepared and assembled into the form of the 2032 coin cell.

Example 2

(1) Manufacture of positive electrode 0.12 g of powder-type carbon nanotubes (K-Nanos 500P from Kumho Petrochemical Co. Ltd.) were prepared as a conductive material, and 3.5 g of 1-ethyl-3-methylimidazolium bis(trifluoromethylsulfonyl)imide (EMIM-TFSI) was prepared as an ionic liquid. The prepared conductive material and ionic liquid were mixed, and the mixture was stirred in a mortar for 30 minutes to obtain a desired mixed slurry. The stirred mixed slurry was applied to a prepared carbon sheet substrate to manufacture a positive electrode for lithium air batteries.

(2) Manufacture of lithium air battery

Lithium foil was used as a negative electrode, a SUS spacer was used as a negative electrode current collector, polyethylene oxide non-woven fabric doped with lithium salt, an ionic liquid, and a polymer was used as a polymer electrolytic membrane, and the positive electrode manufactured as described above was used as a positive electrode. The polymer electrolytic membrane was interposed between the negative electrode and the positive electrode as a separator to manufacture a lithium air battery.

Comparative Example 1

A lithium air battery was manufactured using the same composition and method as in Example 1, except for the following:

In manufacturing a positive electrode, 4 wt % of powder-type carbon nanotubes (K-Nanos 500P from Kumho Petrochemical Co. Ltd.), as a conductive material, was mixed with a solvent to manufacture a carbon-nanotube slurry. At this time, water was used as the solvent.

Comparative Example 2

A lithium air battery was manufactured using the same composition and method as in Example 1, except for the following:

In manufacturing a positive electrode, 4 wt % of powder-type carbon nanotubes (K-Nanos 500P from Kumho Petrochemical Co. Ltd.), as a conductive material, was mixed with a solvent to manufacture a carbon-nanotube slurry. At this time, N-methyl-2-pyrrolidone was used as the solvent.

Comparative Example 3

A lithium air battery was manufactured using the same composition and method as in Example 2, except that separator was omitted.

Experimental Example 1

Figure 2:
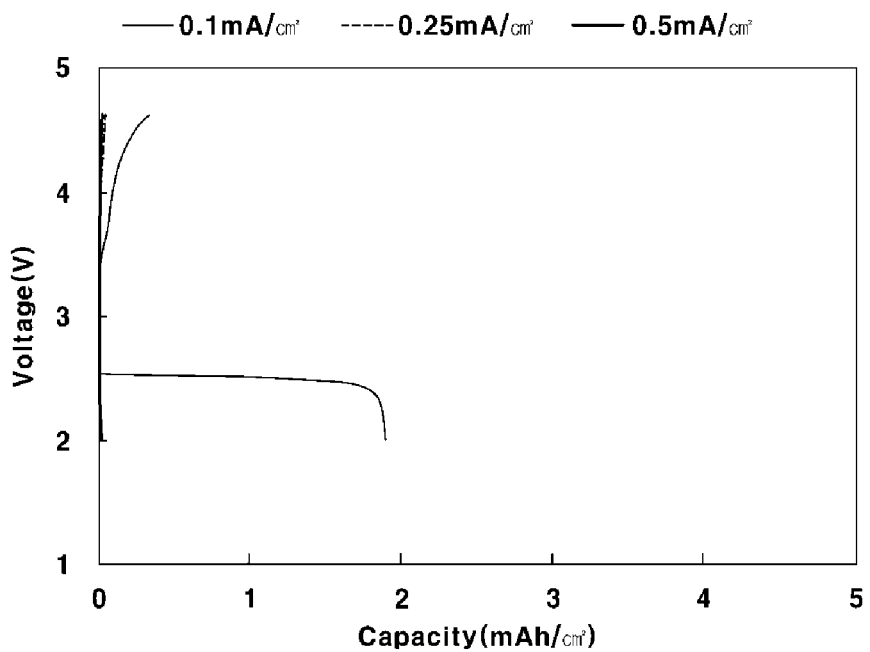
FIG. 2 shows the charge/discharge effects of a lithium air battery manufactured according to Comparative Example 2.
Figure 3:
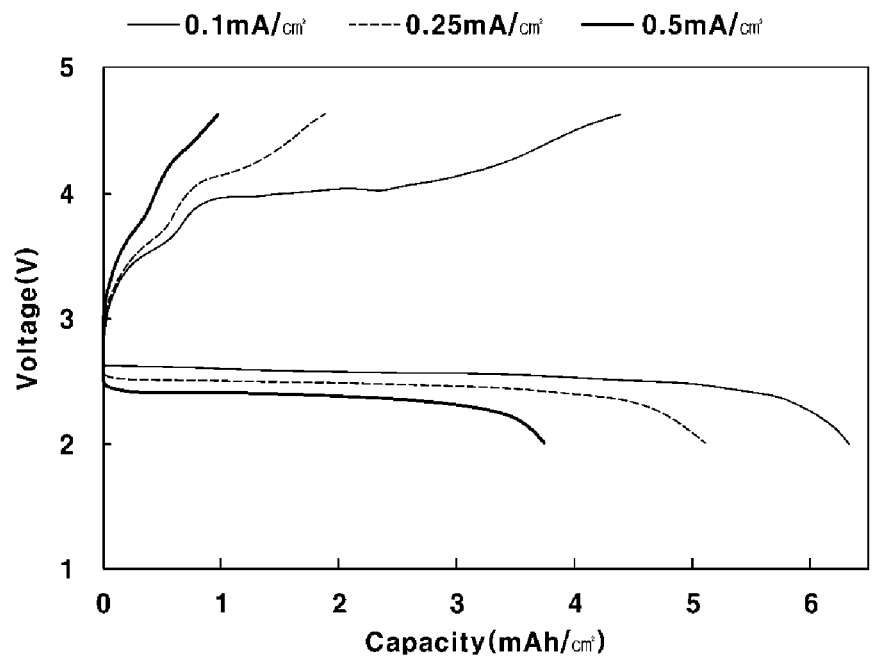
FIG. 3 shows the charge/discharge effects of an exemplary lithium air battery manufactured in Example 1 according to an exemplary embodiment of the present invention.

The 0.1 mA/cm$^2$, 0.25 mA/cm$^2$, and 0.5 mA/cm$^2$ charge/discharge effects of the lithium air batteries manufactured according to Example 1, Comparative Example 1, and Comparative Example 2 were measured, and the results are shown in the graphs of FIGS. 1, 2, and 3.

FIG. 3 is an experimental graph of the lithium air battery manufactured according to Example 1. Compared to FIGS. 1 and 2, which are experimental graphs of the lithium air batteries manufactured according to Comparative Example 1 and Comparative Example 2, it can be seen that the discharge capacities of the lithium air battery at 0.5 mA/cm$^2$ were 3.746 mAh/cm$^2$ and 3071 mAh/g, the discharge capacities of the lithium air battery at 0.25 mA/cm$^2$ were 5.108 mAh/cm$^2$ and 4187 mAh/g, and the discharge capacities of the lithium air battery at 0.1 mA/cm$^2$ were 6.321 mAh/cm$^2$ and 5181 mAh/g, which were much higher than the discharge capacities of the lithium air batteries shown in FIGS. 1 and 2.

Therefore, it can be seen that, when the conductive material included in the positive electrode according to exemplary embodiments of the present invention is in the form of powder and is mixed with an ionic liquid, the charge/discharge capacities of the lithium air battery are much greater than when the conductive material included in the positive electrode is slurry.

Experimental Example 2

Figure 4:
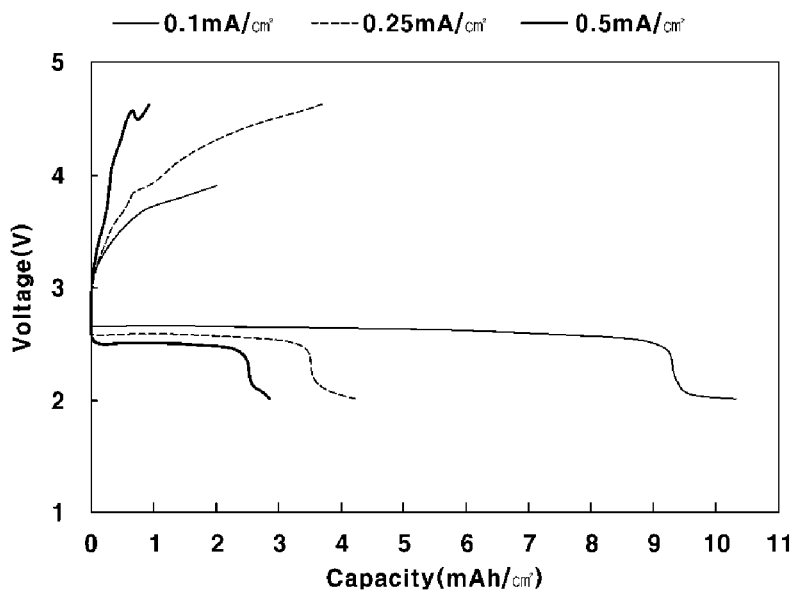
FIG. 4 shows the charge/discharge effects of an exemplary lithium air battery manufactured in Example 2 according to an exemplary embodiment of the present invention.
Figure 5:
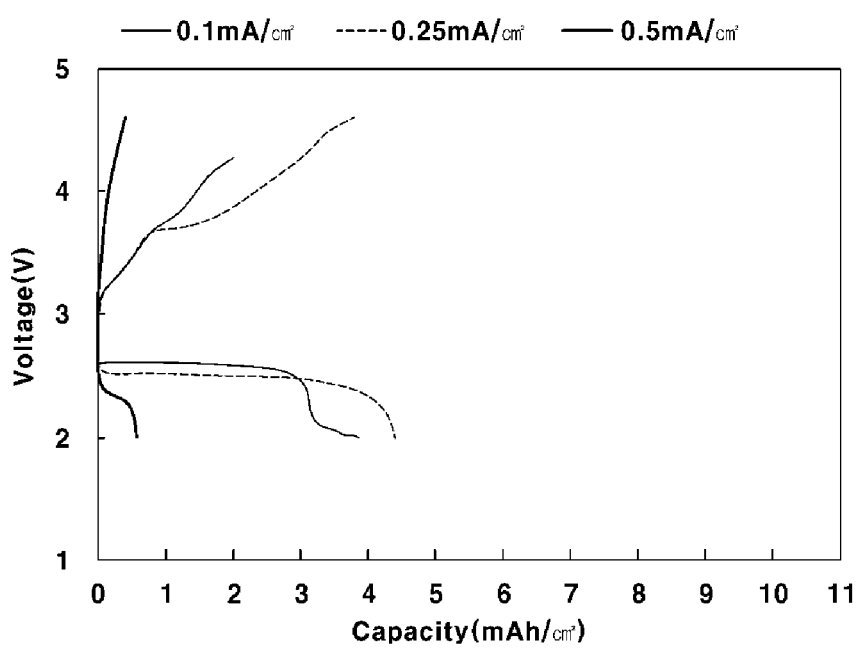
FIG. 5 shows the charge/discharge effects of a lithium air battery manufactured according to Comparative Example 3.

The 0.1 mA/cm$^2$, 0.25 mA/cm$^2$, and 0.5 mA/cm$^2$ charge/discharge effects of the lithium air batteries manufactured according to Example 2 and Comparative Example 3 were measured, and the results are shown in the graphs of FIGS. 4 and 5. At this time, the experiments were performed at a temperature of 60° C.

FIG. 4 is an experimental graph of the lithium air battery manufactured according to Example 2. Compared to FIG. 5, which is an experimental graph of the lithium air battery manufactured according to Comparative Example 3, it can be seen that the discharge capacities of the lithium air battery at 0.5 mA/cm$^2$ were 2.53 mAh/cm$^2$ and 2611 mAh/g, the discharge capacities of the lithium air battery at 0.25 mA/cm$^2$ were 3.53 mAh/cm$^2$ and 3643 mAh/g, and the discharge capacities of the lithium air battery at 0.1 mA/cm$^2$ were 9.36 mAh/cm$^2$ and 9658 mAh/g, which were much higher than the discharge capacities of the lithium air battery shown in FIG. 5.

Accordingly, it can be seen that, when the polymer electrolytic membrane according to the present invention is used alone, the charge/discharge capacities of the lithium air battery are much higher than when both the polymer electrolytic membrane and the ionic liquid electrolyte are used. In the case in which the polymer electrolytic membrane is used alone, it is necessary to provide an ion transfer channel in the positive electrode. In the case in which both the polymer electrolytic membrane and the ionic liquid are used, the positive electrode is impregnated with the ionic liquid, whereby an ion transfer channel is formed in the positive electrode. However, it is difficult to impregnate the ionic liquid at high viscosity. In the case in which a carbon material having a large specific surface area is used for the positive electrode, it is difficult to impregnate the entire surface area of the positive electrode with the ionic liquid. Since the positive electrode according to the present invention is manufactured by mixing the CNT powder with the ionic liquid, the ion transfer channel is already formed in the positive electrode. In order to use the polymer electrolytic membrane alone, therefore, the positive electrode according to the present invention is essential.

According to various exemplary embodiments of the present invention, a positive electrode for lithium air batteries may be provided such that the side reaction generation rate may be reduced, whereby the capacity and lifespan characteristics of the positive electrode may be improved.

Moreover, according to various exemplary embodiments of the present invention, a method of manufacturing a lithium air battery may be provided, which may include simplifying a process of manufacturing a positive electrode, thereby improving economic efficiency.

The effects of the present invention are not limited to those mentioned above. It should be understood that the effects of the present invention include all effects that can be inferred from the foregoing description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A positive electrode for lithium air batteries, consisting of:
   a conductive material; and
   an ionic liquid,
   wherein:
   neither the conductive material nor the ionic liquid contains a solvent or a binder,
   the ionic liquid includes cations and anions,
   the cations comprise one selected from the group consisting of ethyl methylimidazolium (EMIM), butyl methylimidazolium (BMIM), dimethylimidazolium (MMIM), butyl methylpyrrolidinium ($PYR_{14}$), trimethyl propyl ammonium ($N_{1113}$), butyl trimethyl ammonium ($N_{1114}$), N-methyl-N-butylpiperidinium ($PP_{14}$), N-propyl-N-methylpyrrolidinium ($PYR_{13}$) and mixtures thereof, and
   the anions comprise one selected from the group consisting of chloride (Cl), dicyanamide (DCA), trifluoromethanesulfonate (Otf), trifluoromethyl sulfonyl imide (TFSI), acetate (Ac), hydrate (OH), diethyl phosphate (DEP), thiocyanate (SCN), methyl sulfate ($MeSO_4$), bis(fluorosulfonyl)imide (FSI) and mixtures thereof.

2. The positive electrode according to claim 1, wherein the conductive material comprises one selected from the group consisting of graphite, carbon black, Ketjen black, acetylene black, carbon nanotubes, a reduced graphene oxide and mixtures thereof.

3. A lithium air battery, comprising:
   the positive electrode for lithium air batteries according to claim 1; and
   a negative electrode comprising a lithium metal, a lithium alloy, or a combination thereof.

4. The lithium air battery according to claim 3, further comprising a membrane provided between the positive electrode and the negative electrode, wherein the membrane comprises a separator, a polymer electrolytic membrane, and a combination thereof.

5. The lithium air battery according to claim 4, wherein the separator comprises a polyolefin polymer.

6. The lithium air battery according to claim 3, further comprising an electrolyte provided between the positive electrode and the negative electrode.

7. The lithium air battery according to claim 6, wherein the electrolyte comprises a solid electrolyte, a liquid electrolyte, or a combination thereof.

8. The lithium air battery according to claim 6, wherein the electrolyte comprises an ionic liquid, lithium salt, or a combination thereof.

* * * * *